(12) United States Patent
Srivastava

(10) Patent No.: US 7,605,373 B2
(45) Date of Patent: Oct. 20, 2009

(54) SCINTILLATOR COMPOSITIONS CONTAINING CERIUM AND PRASEODYMIUM ACTIVATOR IONS, AND RELATED METHODS AND ARTICLES OF MANUFACTURE

(75) Inventor: Alok Mani Srivastava, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 41 days.

(21) Appl. No.: 11/565,945

(22) Filed: Dec. 1, 2006

(65) Prior Publication Data
US 2008/0128623 A1    Jun. 5, 2008

(51) Int. Cl.
*G01T 1/20* (2006.01)
(52) U.S. Cl. .................................. 250/361 R
(58) Field of Classification Search ........... 252/301.4 P;
250/361 R
See application file for complete search history.

(56) References Cited

U.S. PATENT DOCUMENTS

| 5,313,504 | A | * | 5/1994 | Czirr ........................ 376/153 |
| 5,725,800 | A | * | 3/1998 | Huguenin .............. 252/301.4 P |
| 5,788,883 | A |   | 8/1998 | Srivastava et al. |
| 6,995,374 | B2 | * | 2/2006 | Lefaucheur et al. .... 250/370.11 |
| 2005/0082484 | A1 |   | 4/2005 | Srivastava et al. |
| 2005/0285041 | A1 |   | 12/2005 | Srivastava et al. |
| 2008/0030120 | A1 | * | 2/2008 | Fan et al. ..................... 313/484 |

OTHER PUBLICATIONS

A. Lempicki et al., "Cerium-Doped Orthophosphates: New Promising Scintiillators," IEEE Transactions on Nuclear Science, vol. 40, No. 4, Aug. 1993, pp. 384-387.

A.J. Wojtowicz et al., "Optical Spectroscopy and Scintillation Mechanisms of CexLa1-xF3," Physical Review B, vol. 49, No. 21, The American Physical Society, Jun. 1, 1994, pp. 14880-14895.

* cited by examiner

*Primary Examiner*—Constantine Hannaher
(74) *Attorney, Agent, or Firm*—Franics T. Coppa

(57) ABSTRACT

A scintillator composition is described. The scintillator composition includes a lutetium phosphate matrix, a cerium activator ion for the matrix material, a praseodymium activator ion, and any reaction products thereof. Radiation detectors that use scintillators for detecting high-energy radiation are also described. Related methods for detecting high-energy radiation are also included.

9 Claims, 1 Drawing Sheet

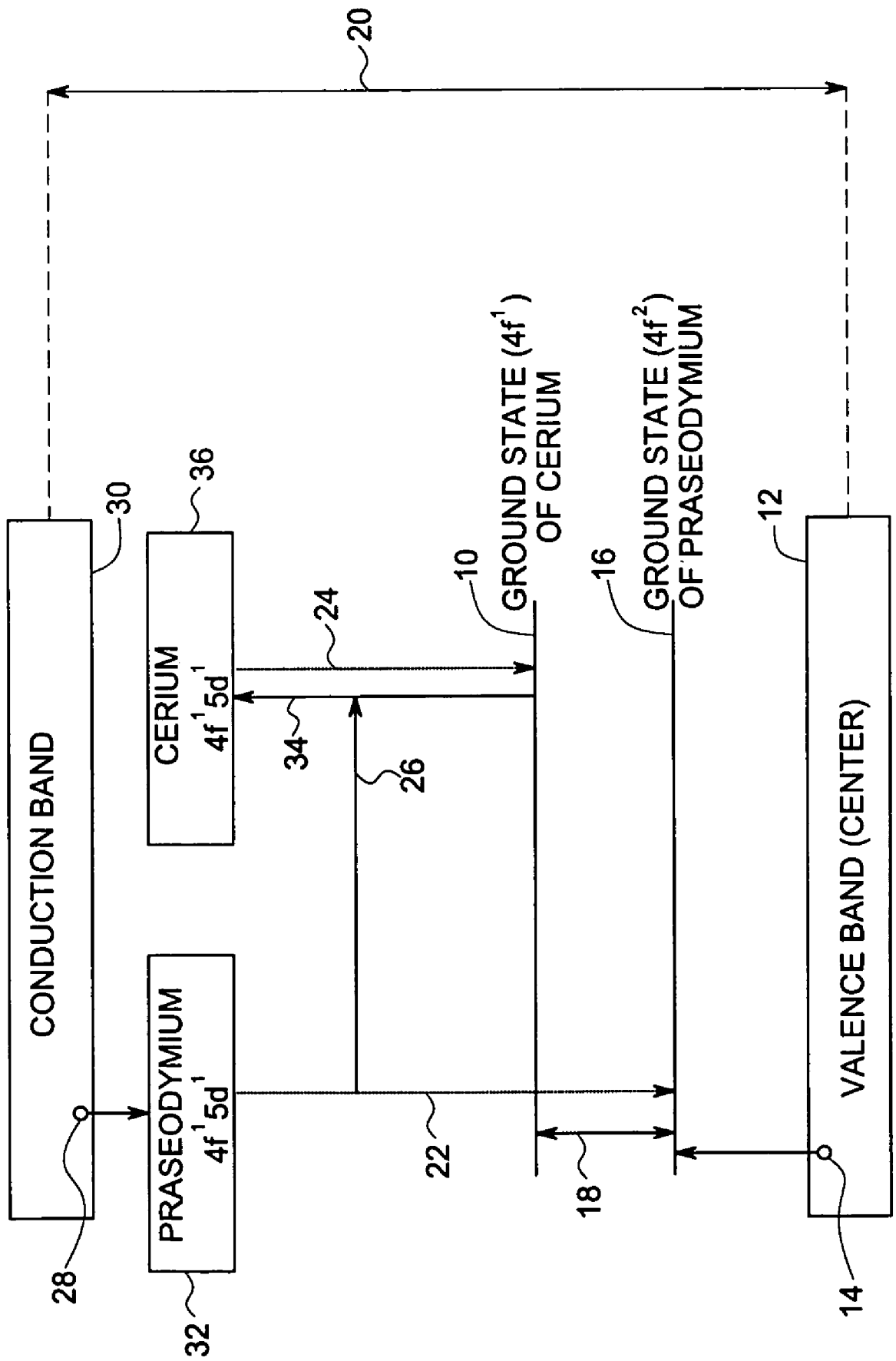

SCINTILLATOR COMPOSITIONS CONTAINING CERIUM AND PRASEODYMIUM ACTIVATOR IONS, AND RELATED METHODS AND ARTICLES OF MANUFACTURE

BACKGROUND OF THE INVENTION

In a general sense, this invention relates to materials and devices used in the detection of ionizing radiation. More specifically, it relates to scintillator compositions which are especially useful for detecting gamma-rays and X-rays under a variety of conditions.

Many techniques are available for detecting high-energy radiation. Scintillators are of special interest, in view of their simplicity and accuracy. Thus, scintillator crystals are widely used in detectors for gamma-rays, X-rays, cosmic rays, and particles characterized by an energy level of greater than about 1 keV. From such crystals, it is possible to manufacture detectors, in which the crystal is coupled with a light-detection means, i.e., a photodetector. When photons from a radionuclide source impact the crystal, the crystal emits light. The photodetector produces an electrical signal proportional to the number of light pulses received, and to their intensity. Scintillator crystals are in common use for many applications. Examples include medical imaging equipment, e.g., positron emission tomography (PET) devices; well-logging for the oil and gas industry, and various digital imaging applications.

As those skilled in the art understand, the composition of the scintillator is critical to the performance of the radiation detection equipment. The scintillator must be responsive to X-ray and gamma ray excitation. Moreover, the scintillator should possess a number of characteristics which enhance radiation detection. For example, most scintillator materials must possess high light output, short decay time, reduced afterglow, high "stopping power", and acceptable energy resolution. (Other properties can also be very significant, depending on how the scintillator is used, as mentioned below).

Those skilled in the art are familiar with all of these properties. In brief, "light output" is the quantity of visible light emitted by the scintillator after being excited by a pulse of the x-ray or gamma ray. High light output is desirable because it enhances the radiation detector's ability to convert the light into an electric pulse. (The size of the pulse usually indicates the amount of radiation energy).

The term "decay time" refers to the time required for the intensity of the light emitted by the scintillator to decrease to a specified fraction of the light intensity at the time when the radiation excitation ceases. For many applications, such as the PET devices, shorter decay times are preferred because they allow efficient coincidence-counting of gamma rays. Consequently, scan times are reduced, and the device can be used more efficiently.

"Stopping power" is the ability of a material to absorb radiation, and is sometimes referred to as the material's "X-ray absorption" or "X-ray attenuation". Stopping power is directly related to the density of the scintillator material. Scintillator materials which have high stopping power allow little or no radiation to pass through, and this is a distinct advantage in efficiently capturing the radiation.

The "energy resolution" of a radiation detector refers to its ability to distinguish between energy rays (e.g., gamma rays) having very similar energy levels. Energy resolution is usually reported as a percentage value, after measurements are taken at a standard radiation emission energy for a given energy source. Lower energy resolution values are very desirable, because they usually result in a higher quality radiation detector.

A variety of scintillator materials which possess most or all of these properties have been in use over the years. For example, thallium-activated sodium iodide (NaI(Tl)) has been widely employed as a scintillator for decades. Crystals of this type are relatively large and fairly inexpensive. Moreover, NaI(Tl) crystals are characterized by a very high light output.

Examples of other common scintillator materials include bismuth germanate (BGO), cerium-doped gadolinium orthosilicate (GSO), and cerium-doped lutetium orthosilicate (LSO). Each of these materials has some good properties which are very suitable for certain applications.

As those familiar with scintillator technology understand, all of the conventional materials possess one or more deficiencies, along with their attributes. For example, thallium-activated sodium iodide is a very soft, hygroscopic material, readily absorbing oxygen and moisture. Moreover, such a material produces a large and persistent after-glow, which can interfere with the intensity-counting system. Furthermore, the decay time of NaI(Tl), about 230 nanoseconds, is too slow for many applications. The thallium component may also require special handling procedures, in view of health and environmental issues.

BGO, on the other hand, is non-hygroscopic. However, the light yield of this material (15 percent of NaI(Tl)), is too low for many applications. The material also has a slow decay time. Moreover, it has a high refractive index, which results in light loss due to internal reflection.

It is thus clear that new scintillator materials would be very welcome in the art, if they could satisfy the ever-increasing demands for commercial and industrial use. The materials should exhibit excellent light output, as well as relatively fast decay times. They should also possess good energy resolution characteristics, especially in the case of gamma rays. Moreover, the new scintillators should be readily transformable into monocrystalline materials or other transparent solid bodies. Furthermore, they should be capable of being produced efficiently, at reasonable cost and acceptable crystal size. The scintillators should also be compatible with a variety of high-energy radiation detectors. Methods for determining the most favorable conditions under which multiple activator ions cooperatively function in the host matrix of a scintillator composition would also be of considerable interest.

BRIEF DESCRIPTION OF THE INVENTION

One embodiment of the invention is directed to a scintillator composition. The composition includes a lutetium phosphate matrix; a cerium activator ion, and a praseodymium activator ion for the matrix; and any reaction products thereof.

Another embodiment of the invention is directed to a radiation detector for detecting high-energy radiation. The detector includes a crystal scintillator which includes the following composition, and any reaction products thereof. The composition comprises lutetium phosphate, and a combination of cerium and praseodymium activator ions. The detector further includes a photodetector optically coupled to the scintillator, so as to be capable of producing an electrical signal in response to the emission of a light pulse produced by the scintillator.

Yet another embodiment of the invention is directed to a method for detecting high-energy radiation with a scintillation detector. The method includes receiving radiation by a cerium and praseodymium activated, lutetium phosphate-based scintillator crystal, so as to produce photons which are characteristic of the radiation. The method further includes detecting the photons with a photon detector coupled to the scintillator crystal.

Another embodiment of the invention is directed to a method for producing an activated, lutetium phosphate-based scintillator crystal. The scintillator crystal includes a lutetium phosphate matrix material, and a combination of a cerium and praseodymium activators for the matrix material. The method comprises supplying at least one lutetium-containing reactant, at least one activator-containing reactant, and at least one phosphate-containing reactant; according to proportions which satisfy the stoichiometric requirements for the scintillator crystal. The method further comprises melting the reactants at a temperature sufficient to form a molten composition; and crystallizing a crystal from the molten composition.

Another embodiment of the invention is directed to a method of determining the conditions under which the praseodymium ion excites the luminescnence of a cerium ion in the presence of a host matrix of a scintillator composition. The method comprises the steps of determining if the praseodymium ion is incorporated in a host matrix, such that the ground state of the praseodymium ion is located within a forbidden gap of cerium, determining if the praseodymium ion is dominated by a $4f^1 5d^1$ to $4f^2$ transition, and determining that an emission band of cerium ion does not overlap with $4f^2$ excited states of the praseodymium ion.

Further details regarding the various features of this invention are found in the remainder of the specification.

BRIEF DESCRIPTION OF THE DRAWING

FIG. 1 is an energy band diagram for a cerium activator ion and the praseodymium activator ion.

DETAILED DESCRIPTION OF THE INVENTION

As mentioned above, the present invention includes a lutetium phosphate matrix material for a scintillator composition. The scintillator composition further includes a combination of cerium and praseodymium activator ions. The activator ions may be in the form of a solid solution. As used herein, the term "solid solution" refers to a mixture of the oxides in solid, crystalline form, which may include a single phase, or multiple phases. (Those skilled in the art understand that phase transitions may occur within a crystal after formation of the crystal, e.g., after subsequent processing steps like sintering or densification).

A portion of lutetium in the lutetium phosphate matrix material may be substituted by one or more other lanthanides. The other lanthanides may be any of the rare earth elements, i.e., lanthanum, yttrium, gadolinium, lutetium, scandium, praseodymium, neodymium, samarium, europium, gadolinium, terbium, dysprosium, holmium, erbium, thulium, and ytterbium. Mixtures of two or more of the lanthanides are also possible. For the purpose of this disclosure, yttrium is also considered to be a part of the lanthanide family. (Those skilled in the art understand that yttrium is closely associated with the rare earth group). Preferred lanthanides are selected from the group consisting of lanthanum, yttrium, gadolinium, scandium, terbium, and mixtures thereof.

In some embodiments, the amount of lutetium replaced by the other lanthanide(s) is up to about 20 mole percent of the total amount of the matrix material. In other embodiments, the amount of lutetium replaced by the other lanthanide is in a range from about 10 mole percent to about 20 mole percent. In these embodiments, the portion of the lutetium may be either replaced by a single lanthanide or a combination of two or more lanthanides. In an exemplary embodiment, where a 10 mole percent of lutetium is replaced by yttrium, the scintillator composition may be represented by $(Lu_{0.90}Y_{0.10}):Ce, Pr$, where cerium and praseodymium are activator ions.

The amount of the activator ions present in the scintillator composition will depend on various factors, such as the matrix material being used; the desired emission properties and decay time; and the type of detection device into which the scintillator is being incorporated. Usually, the activator ions are employed at a level in the range of about 0.1 mole percent to about 20 mole percent, based on total moles of the activator ions and the lutetium phosphate matrix material. In many preferred embodiments, the total amount of the cerium and praseodymium activator ions is in the range of about 1 mole percent to about 10 mole percent. In some embodiments, the cerium activator ion is present in a range of from about 1 mole percent to about 10 mole percent, and the praseodymium activator ion is present in a range of from about 0.5 mole percent to about 5 mole percent.

As will be described in detail below, the praseodymium activator ion is employed to transfer energy to the cerium activator ion. The amount of praseodymium is less than the amount of cerium, depending on the solid solubility of praseodymium in the matrix material. The specific ratio of cerium and praseodymium activator ions will depend on various factors, such as the desired properties mentioned above, e.g., light output and energy resolution. In some embodiments, the molar ratio of cerium to praseodymium is in a range of from about 99:1 to about 90:10.

The addition of praseodymium in the lutetium phosphate matrix having cerium activator ion improves the light yield of the cerium activator ion. Reference to FIG. 1 is instructive in this regard. Typically, the low light yield of many scintillators that employ cerium as the activator ion is attributed to the fact that the ground state 10 of the cerium ion is located at too high an energy level from the top of the valence band 12. Under this condition, the holes 14 that are formed in the valence band 12 as a result of band gap excitation are inefficiently trapped by the cerium ion. It should be noted that, under X-ray excitation, the hole-capturing efficiency of the praseodymium activator ion exceeds that of the cerium activator ion. This occurrence is due to the fact that the ground state 16 of the praseodymium activator ion is always about 1.56 eV lower than the ground state 10 of the cerium activator ion, as illustrated by the arrow 18. Hence, the praseodymium ion may act as an efficient hole-capturing center in a lutetium phosphate matrix or other solids, where the cerium activator ion is relatively inefficient in capturing the holes 14. The general mechanism by which the praseodymium activator ion may increase the scintillating light yield of the cerium ion includes more efficient trapping of the valence band holes by the praseodymium ion. The more efficient trapping of the holes by the praseodymium ion may also impede the formation of self-trapped excitation states.

In a lutetium phosphate host lattice, the luminescence of the praseodymium activator ion is dominated by the spin and parity-allowed transitions of $4f^1 5d^1$ to $4f^2$ interconfigurational optical transitions. In such transitions, the quantum efficiency is about 100 percent, and the decay time is in the range of about 10 ns to about 20 ns. As used herein, the term "quantum efficiency" refers to the photon-to-electron conversion efficiency of a scintillator composition. With the incorporation of the cerium activator ion in the same host lattice, the emitted energy from the praseodymium activator ion, as it returns to the ground state, may be utilized to excite the characteristic cerium activator ion luminescence, via an efficient energy transfer process. In other words, after capturing the hole 14, the praseodymium ion emits via the allowed $4f^15d^1$ level 32 to $4f^2$ level 16 (ground state of the praseodymium) optical transition represented by the arrow 22. The cerium activator ion does not transfer its energy to the $4f^2$ levels of the praseodymium ion. Therefore, the light yield from the cerium activator ion is expected to increase via the praseodymium to cerium energy transfer step. The $4f^15d^1$ to $4f^2$ interconfigurational emission 22 that arises due to the recombination of electron-hole pair on the praseodymium ion may be transferred to the cerium ion as illustrated by the arrow 26, since the praseodymium emission 22 overlaps with the cerium absorption 34, due to their respective electronic energy level structures. In this way, efficient sensitization of the cerium emission takes place under band gap excitation. This sensitization process increases the light yield from the cerium ion. The praseodymium plays an intermediate role in the transport of excitation energy from the host lattice to the cerium ion.

For the praseodymium ion to act as a sensitizer for the cerium activator ion, in terms of emission under excitation by high-energy radiation (e.g., X-ray, or gamma ray), the following conditions need to be satisfied: (1) The ground state 16 of the praseodymium ion must be located within the forbidden gap 20 of the cerium ion. As used herein, the term "forbidden gap" is an energy difference between the top of a valence band and the bottom of a conduction band. (2) The emission 22 by the praseodymium ion must be dominated by the $4f^15d^1$ to $4f^2$ interconfigurational optical transition; which takes place by a combination of electron 28 from the bottom of the conduction band 30 with the hole 14 of the valence band 12 at the $4f^15d^1$ level 32 of praseodymium. Also, the probability of non-radiative relaxation of the $4f^15d^1$ level 32 into the $4f^2$ level 16 must be small relative to the radiative decay time of the praseodymium ion. (3) The emission band 24 which occurs between $4f^15d^1$ level 36 and $4f^1$ level 10 of the cerium ion should not overlap with the $4f^2$ excited states the praseodymium ion; to avoid back energy transfer from the cerium ion to the praseodymium ion. (4) In general, the quantum efficiency of both cerium and praseodymium should be high. For example, the quantum efficiency of both cerium and praseodymium may be in a range of about 80 percent to about 100 percent.

The composition of this invention may be prepared in several different forms. In some preferred embodiments, the composition is in monocrystalline (i.e., "single crystal") form. Monocrystalline scintillation crystals have a greater tendency for transparency. They are especially useful for high-energy radiation detectors, e.g., those used for gamma rays. In one embodiment, the scintillator composition may be in the form of a detector element.

However, the composition can be in other forms as well, depending on its intended end use. For example, it can be in powder form. It can also be prepared in the form of a polycrystalline ceramic. It should also be understood that the scintillator compositions may contain small amounts of impurities. These impurities usually originate with the starting materials, and typically constitute less than about 0.1 percent by weight of the scintillator composition. Very often, they constitute less than about 0.01 percent by weight of the composition. The composition may also include parasite phases, whose volume percentage is usually less than about 1 percent. Moreover, minor amounts of other materials may be purposefully included in the scintillator compositions, as taught in U.S. Pat. No. 6,585,913 (Lyons et al), which is incorporated herein by reference. For example, praseodymium oxide and/or terbium oxide can be added to reduce afterglow. Calcium and/or dysprosium can be added to reduce the likelihood of radiation damage.

Methods for preparing the scintillator materials are generally known in the art. The compositions can usually be prepared by wet or dry processes. (It should be understood that the scintillator compositions may contain a variety of reaction products of these processes). Some exemplary techniques for preparing the polycrystalline materials are described in the above-mentioned Lyons patent, as well as in U.S. Pat. No. 5,213,712 (Dole), and U.S. Pat. No. 5,882,547 (Lynch et al), which are incorporated herein by reference. Usually, a suitable powder containing the desired materials in the correct proportions is first prepared, followed by such operations as calcination, die forming, sintering, and/or hot isostatic pressing. The powder can be prepared by mixing various forms of the reactants (e.g., salts, oxides, halides, oxalates, carbonates, nitrates, or mixtures thereof). For example, lutetium oxide, cerium oxide and praseodymium oxide may be mixed with a phosphate source, such as ammonium hydrogen phosphate. Mixing can be carried out in the presence of a liquid such as water, an alcohol, or a hydrocarbon.

In one illustrative dry process, the appropriate reactants are usually supplied in powder form. For example, one or more lutetium-containing reactants can be mixed with one or more phosphate-containing reactants, and cerium and praseodymium-containing reactants, in proportions which satisfy the stoichiometric requirements for the scintillator crystal. (At least two activator-containing reactants are used for cerium and praseodymium). The lutetium reactants and the activator reactants are often oxygen-containing compounds, e.g., oxides, nitrates, acetates, oxalates, sulfates, phosphates, or combinations of any of the foregoing. Under specified conditions, many of these compounds decompose to a form of the desired compounds, e.g., phosphates of lutetium, cerium and praseodymium. A calcining step is sometimes required to obtain the corresponding compounds.

The mixing of the reactants can be carried out by any suitable means which ensures thorough, uniform blending. For example, mixing can be carried out in an agate mortar and pestle. Alternatively, a blender or pulverization apparatus can be used, such as a ball mill, a bowl mill, a hammer mill, or a jet mill. The mixture can also contain various additives, such as fluxing compounds and binders. Depending on compatibility and/or solubility, water, heptane, or an alcohol such as ethyl alcohol can sometimes be used as a liquid vehicle during milling. Suitable milling media should be used, e.g., material that would not be contaminating to the scintillator, since such contamination could reduce its light-emitting capability.

After being blended, the mixture is fired under temperature and time conditions sufficient to convert the mixture into a solid solution. These conditions will depend in part on the specific type of matrix material and activator being used. Usually, firing will be carried out in a furnace, at a temperature in the range of about 1000° C. to about 1500° C. A preferred range is about 1200° C. to about 1400° C. The firing time will typically range from about 15 minutes to about 10 hours.

Firing may be carried out in an inert atmosphere. Examples include gases, such as hydrogen, nitrogen, helium, neon, argon, krypton, and xenon. After firing is complete, the resulting material can be pulverized, to put the scintillator into powder form. Conventional techniques can then be used to process the powder into radiation detector elements.

Methods for making the single crystal materials are also well-known in the art. A non-limiting, exemplary reference is "Luminescent Materials", by G. Blasse et al, Springer-Verlag (1994). Usually, the appropriate reactants are melted at a temperature sufficient to form a congruent, molten composition. The melting temperature will depend on the identity of the reactants themselves, but is usually in the range of about 650° C. to about 2500° C.

In most embodiments where a single crystal is desired, the crystal is formed from the molten composition by a suitable technique. A variety of techniques can be employed. They are described in many references, such as U.S. Pat. No. 6,437,336 (Pauwels et al); "Crystal Growth Processes", by J. C. Brice, Blackie & Son Ltd (1986); and the "Encyclopedia Americana", Volume 8, Grolier Incorporated (1981), pages 286-293. These descriptions are incorporated herein by reference. Non-limiting examples of the crystal-growing techniques are the Bridgman-Stockbarger method; the Czochralski method, the zone-melting method (or "floating zone" method), and the temperature gradient method. Those skilled in the art are familiar with the necessary details regarding each of these processes.

One non-limiting illustration can be provided for producing a scintillator in single crystal form, based in part on the teachings of the Lyons et al patent mentioned above. In this method, a seed crystal of the desired composition (described above) is introduced into a saturated solution. The solution is contained in a suitable crucible, and contains appropriate precursors for the scintillator material. The new crystalline material is allowed to grow and add to the single crystal, using one of the growing techniques mentioned above. The size of the crystal will depend in part on its desired end use, e.g., the type of radiation detector in which it will be incorporated.

Methods for preparing the scintillator material in other forms are also known in the art. For example, in the case of the polycrystalline ceramic form mentioned above, the scintillator material is first produced in powder form (or converted to powder form), as described previously. The material is then sintered to transparency by conventional techniques (e.g., in a furnace), at a temperature which is typically about 65 percent to 85 percent of the melting point of the powder. The sintering can be carried out under atmospheric conditions, or under pressure.

Yet another embodiment of the invention is directed to a method for detecting high-energy radiation with a scintillation detector. The detector includes one or more crystals, formed from the scintillator composition described herein. Scintillation detectors are well-known in the art, and need not be described in detail here. Several references (of many) which discuss such devices are U.S. Pat. Nos. 6,585,913 and 6,437,336, mentioned above, and U.S. Pat. No. 6,624,420 (Chai et al), which is also incorporated herein by reference. In general, the scintillator crystals in these devices receive radiation from a source being investigated, and produce photons which are characteristic of the radiation. The photons are detected with some type of a photodetector. (The photodetector is connected to the scintillator crystal by conventional electronic and mechanical attachment systems). The photodetector is optically coupled to the scintillator, so as to be capable of producing an electrical signal in response to the emission of a light pulse produced by the scintillator.

As mentioned above, the photodetector can be a variety of devices, all well-known in the art. Non-limiting examples include photomultiplier tubes, photodiodes, CCD sensors, and image intensifiers. Choice of a particular photodetector will depend in part on the type of radiation detector being fabricated, and on its intended use.

The radiation detectors themselves, which include the scintillator and the photodetector, can be connected to a variety of tools and devices, as mentioned previously. Non-limiting examples include well-logging tools and nuclear medicine devices (e.g., PET). The radiation detectors may also be connected to digital imaging equipment, e.g., pixilated flat panel devices. Moreover, the scintillator may serve as a component of a screen scintillator. For example, powdered scintillator material could be formed into a relatively flat plate which is attached to a film, e.g., photographic film. High energy radiation, e.g., X-rays, originating from some source, would contact the scintillator and be converted into light photons which are developed on the film.

Several of the preferred end use applications should also be briefly discussed. Well-logging devices were mentioned previously, and represent an important application for these radiation detectors. The technology for operably connecting the radiation detector to a well-logging tube is well-known in the art. The general concepts are described in U.S. Pat. No. 5,869,836 (Linden et al), which is incorporated herein by reference. The crystal package containing the scintillator usually includes an optical window at one end of the enclosure-casing. The window permits radiation-induced scintillation light to pass out of the crystal package for measurement by the light-sensing device (e.g., the photomultiplier tube), which is coupled to the package. The light-sensing device converts the light photons emitted from the crystal into electrical pulses that are shaped and digitized by the associated electronics. By this general process, gamma rays can be detected, which in turn provides an analysis of the rock strata surrounding the drilling bore holes.

Medical imaging equipment, such as the PET devices mentioned above, represent another important application for these radiation detectors. The technology for operably connecting the radiation detector (containing the scintillator) to a PET device is also well-known in the art. The general concepts are described in many references, such as U.S. Pat. No. 6,624,422 (Williams et al), incorporated herein by reference. In brief, a radiopharmaceutical is usually injected into a patient, and becomes concentrated within an organ of interest. Radionuclides from the compound decay and emit positrons. When the positrons encounter electrons, they are annihilated and converted into photons, or gamma rays. The PET scanner can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes.

In both the well-logging and PET technologies, the light output of the scintillator is critical. The present invention provides scintillator materials which can provide the desired light output for demanding applications of the technologies. Moreover, the crystals can simultaneously exhibit the other important properties noted above, e.g., short decay time, reduced afterglow, high "stopping power", and acceptable energy resolution. Furthermore, the scintillator materials can be manufactured economically, and can also be employed in a variety of other devices which require radiation detection.

This invention has been described according to specific embodiments and examples. However, various modifications, adaptations, and alternatives may occur to one skilled in the art without departing from the spirit and scope of the claimed inventive concept. All of the patents, articles, and texts which are mentioned above are incorporated herein by reference.

What is claimed:

1. A radiation detector for detecting high-energy radiation, comprising:
    (A) a crystal scintillator which comprises the following composition, and any reaction products thereof:
        (a) lutetium phosphate
        (b) a combination of cerium and praseodymium activator ions; and
    (B) a photodetector optically coupled to the scintillator, so as to be capable of producing an electrical signal in response to the emission of a light pulse produced by the scintillator.

2. The radiation detector of claim 1, wherein the photodetector is at least one device selected from the group consisting of a photomultiplier tube, a photodiode, a CCD sensor, and an image intensifier.

3. The radiation detector of claim 1, operably connected to a nuclear medicine apparatus.

4. The radiation detector of claim 3, wherein the nuclear medicine apparatus comprises a positron emission tomography (PET) device.

5. A method for detecting high-energy radiation with a scintillation detector, comprising the steps of:
    (A) receiving radiation by a cerium and praseodymium activated, lutetium phosphate-based scintillator crystal, so as to produce photons which are characteristic of the radiation; and
    (B) detecting the photons with a photon detector coupled to the scintillator crystal;
    wherein the scintillator crystal is formed of a composition comprising the following, and any reaction products thereof:
        (a) a lutetium phosphate matrix material; and
        (b) a combination of a cerium activator and a praseodymium activator for the matrix material.

6. A method for producing an activated, lutetium phosphate-based scintillator crystal which comprises:
    (a) a lutetium phosphate matrix material; and
    (b) a combination of a cerium and praseodymium activators for the matrix material,
said method comprising the following steps:
    (i) supplying at least one lutetium-containing reactant, at least one activator-containing reactant; and at least one phosphate-containing reactant; according to proportions which satisfy the stoichiometric requirements for the scintillator crystal;
    (ii) melting the reactants at a temperature sufficient to form a molten composition; and
    (iii) crystallizing a crystal from the molten composition.

7. The method of claim 6, wherein the lutetium-containing reactant and the phosphate-containing reactant comprise a mixture of lutetium oxide and ammonium hydrogen phosphate; and the activator-containing reactant comprises cerium oxide and a praseodymium oxide.

8. The method of claim 6, wherein the reactants are reacted at a temperature in the range of about 1000° C. to about 2500° C.

9. The method of claim 6, wherein the crystallization step (iii) is carried out by a technique selected from the group consisting of the Bridgman-Stockbarger method; the Czochralski method, the zone-melting method, the floating zone method, and the temperature gradient method.

* * * * *